(No Model.)
A. P. HOWES.
FAUCET.
No. 388,362.  Patented Aug. 21, 1888.
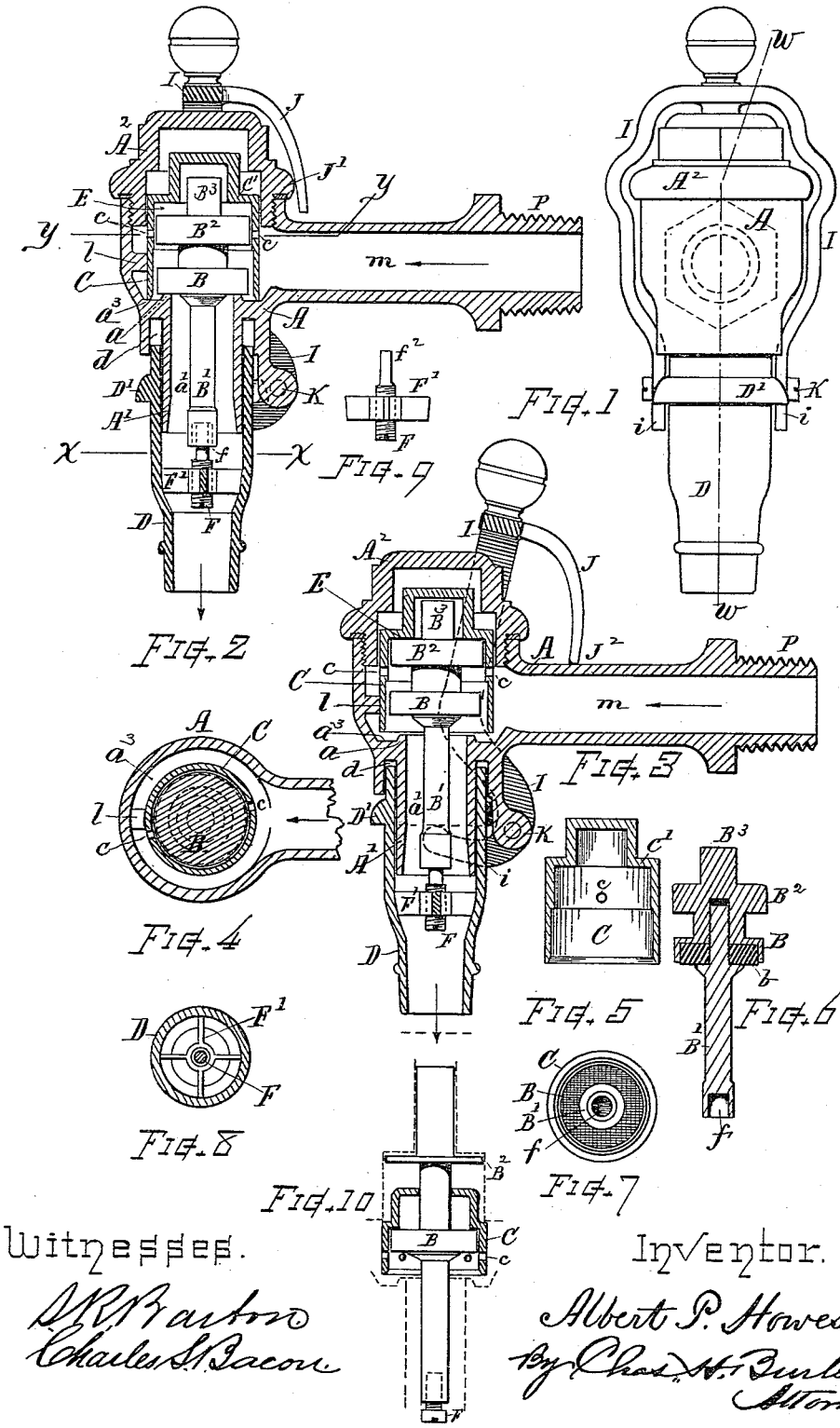

UNITED STATES PATENT OFFICE.

ALBERT P. HOWES, OF WORCESTER, MASSACHUSETTS, ASSIGNOR OF TWO-THIRDS TO EDMUND CONVERSE AND AMBROSE T. MATTHEWS, BOTH OF SAME PLACE.

FAUCET.

SPECIFICATION forming part of Letters Patent No. 388,362, dated August 21, 1888.

Application filed November 5, 1887. Serial No. 254,353. (No model.)

*To all whom it may concern:*

Be it known that I, ALBERT P. HOWES, a citizen of the United States, residing at Worcester, in the county of Worcester and State of Massachusetts, have invented certain new and useful Improvements in Faucets, of which the following, together with the accompanying drawings, is a specification sufficiently full, clear, and exact to enable persons skilled in the art to which this invention appertains to make and use the same.

The object of my present invention is to provide a faucet having means whereby the closing action of its valve is automatically controlled or retarded, so that it will close with an easy motion and without injurious shock when the flow of liquid is shut off, thereby relieving the pipes from strain occasioned by the excess of pressure due to the sudden stopping of the flowing liquid and preventing the thump or hammering incident to all quick-closing faucets under moderate or high degrees of pressure.

Another object of my invention is to provide a self-closing faucet constructed in a manner to extend the closing movement, after the lifting devices have been released, over a sufficient length of time to gradually stop the flow, and thus avoid pounding action and strain on the pipes when the faucet is closed or when the valve strikes its seat.

Another object of my invention is to provide a faucet having duplex valve devices arranged for action, substantially as hereinafter explained, whereby the faucet is adapted for delivering the liquid with different degrees of force and volume.

Another object is to provide, in a faucet wherein the valve is lifted by means of the discharge-nozzle, facilities for adjustment between the nozzle and valve.

These objects I attain by a faucet constructed and organized for operation as illustrated and explained in the following description, the particular subject-matter claimed being hereinafter definitely specified.

In the drawings, Figure 1 is a front view of a faucet illustrating my invention. Fig. 2 is a vertical sectional view of the same at line $w\ w$, showing the parts in position as when the faucet is closed. Fig. 3 is a similar sectional view showing the faucet opened. Fig. 4 is a horizontal section at line $y\ y$ on Fig. 2. Fig. 5 is a central section of the valve case or cup separate from other parts. Fig. 6 is a central section of the valve-puppet. Fig. 7 is a bottom view of the valve and cup together. Fig. 8 is a horizontal section at line $x\ x$, showing the step-bridge. Fig. 9 is a separate side view of the step-bridge and adjusting-screw. Fig. 10 shows a modification in construction of the valve and cup.

In referring to parts, A denotes the shell or body of the faucet, provided with suitable means for attaching it to the supply-pipe at P and made with a suitable inlet-passage, $m$, a chamber for the valve devices, and a downwardly-projecting extension, A', through which the discharge-passage $a'$ is formed. A suitable valve-seat is formed at the junction of said discharge-passage with the valve-chamber, and a nut or cap, $A^2$, is screwed into the top of the body for covering and closing the chamber.

B indicates the valve or puppet, which closes the discharge-passage. Said valve-puppet is provided with a packing-plate, $b$, or disk, which rests upon the valve-seat $a$, and with a spindle, B', that extends down through the discharge-passage. It is also provided with an upper disk, $B^2$, for a purpose hereinafter described.

C indicates a loose valve-cover or inverted cup fitted over the valve-puppet in the manner shown, with its lower end seated upon an annular surface, $a^3$, surrounding the seat $a$ of the valve B, so that the cup forms an outer or auxiliary valve for cutting off the flow of liquid around said valve B, except when said cup is elevated. A chamber, E, is provided in the upper part of the cup above the valve. Said cup C is preferably made in the form shown, with a lug or shoulder at C', against which the valve-puppet engages at an intermediate point of its movement for lifting the cup when the valve is raised to the full extent of its movement; or, if preferred, the top end, $B^3$, of the valve may serve for lifting the cup.

The upper disk, B², of the valve-puppet is fitted to the interior of the cup comparatively close, but not so close but that a slight space is left between the periphery of said disk and the inner surface of the cup, to allow the liquid to leak past the disk into or from the chamber E between the disk and the top of the cup.

Small holes c are formed through the sides of the cup for the entrance of liquid to its interior, said holes being preferably located at such a position in relation to the valve-puppet that when the puppet is raised the holes will be fully open, but when the puppet is depressed the periphery of the disk will obstruct or partially close them.

The lower part of the cup is preferably chambered out to larger diameter than the upper part, so as to allow ample and sufficient space for the free passage of liquid between the interior surface of the cup and the periphery of the valve B, although this enlargement in the diameter of the cup is not absolutely essential to the operation of the mechanism.

A lug, l, is in the present instance provided on the interior of the body-shell A, opposite the inlet-passage m, for supporting the valve-cup against the inflowing liquid and to prevent it from being displaced by the pressure against its rear side.

The cap or nut A² is properly chambered out, so that the top of the cup C can pass up into it, said cup being entirely free to rise and fall with any force exerted upon it, but fitting within the cap A² with a sufficient degree of closeness to prevent it from being moved laterally from its proper working arrangement. The valve-puppet B is also free to work up and down within the cup, and all of the adjacent surfaces on both the cup and valve are sufficiently free and separate to obviate any possibility of binding or wedging against each other or against the body.

D indicates a discharge-nozzle surrounding and extending below the body projection A', and arranged to move on said projection for lifting the valve B from its seat. In the step or bridge F', which is disposed across the interior of the nozzle, I arrange a screw-stud, F, the upper end of which engages the valve-spindle for lifting the valve when the nozzle is moved upward on the projection A'. The lower end of the valve-spindle is recessed, as at f, for receiving the end f' of the stud F, and said recess is made of considerably greater diameter than the point F' of the stud, so that the spindle can freely assume its own position thereon, thus permitting the valve to rest squarely on its seat a.

The nozzle D is arranged to slide upon the extension A' of the body, this being the preferable construction for a self-closing faucet such as I have herein illustrated. The nozzle D is provided with a projecting ledge or rim, D'. A lever, I, which extends over the top of the faucet, is pivoted to the body or frame, as at K, with its lower ends, i, engaging beneath the rim D'. Backward movement of the top end of this lever elevates the nozzle D, and thereby lifts the valve B for opening the faucet. Said lever is provided with a knob or handle, by which it can be conveniently operated. A backwardly and downwardly extended arm, J, is connected with the lifting-lever, which arm serves as a stop for limiting the movement of the parts by contact with the rim of the cap, as at J', Fig. 2, when the lever is in forward position, and by contact with the stem of the faucet, as at J², Fig. 3, when the lever is at backward position. The rim D' of the nozzle is cut away at that portion corresponding with the pivoting-boss K for the lever. The interior of the nozzle D in its upper part is bored out with a cylindrical form to match the exterior surface of the projection A', while its lower portion is bored out with a slight contracting taper, and is of smaller caliber than the upper part, so that it will discharge a solid smooth and straight stream. The upper end of the nozzle is fitted to work in an annular groove, d, surrounding the downward-projecting portion A' of the body.

The step-bearing F' is made separate from the nozzle, with cross-arms, as shown in Figs. 8 and 9, of proper length to bridge the interior space and the screw stud fitted through a tapped opening at its center. After the nozzle has been internally bored the step F' is dropped into and driven down within the nozzle, where it is confined by the wedging of the slightly-beveled ends of its cross-arms against the interior surface of the nozzle. By making the parts separate and putting them together in the manner stated I am enabled to conveniently finish or smooth the interior of the nozzle, and also to conveniently fit the screw-studs into the step-bridges before they are secured in place. This is a great facility in the manufacture, besides producing better constructed articles.

By means of the screw-stud F the relative position of the valve B and nozzle D can be adjusted so that the valve will properly meet its seat and be instantly lifted by any movement of the nozzle. This adjustment can be effected at any time, without shutting off the water and without taking the faucet apart, by simply inserting a screw-driver up into the lower end of the nozzle.

The operation is as follows: By pressing back the lever I the nozzle D is lifted, and this in turn, through the bridge F' and stud F, forces upward the valve-puppet B. The first part of the upward movement of the valve closes the chamber E between the disk B² and the upper part of the cup C, while the lower edge of the cup remains seated, as at a³. The liquid then flows through the openings c and out at the discharge-nozzle, giving a smooth stream with but little force, whatever may be the pressure of the liquid in the inlet-pipe m, as the pressure is cut down by the small orifices c in the cup. The farther upward movement of the valve B lifts the cup C from its seat, as indicated in Fig. 3, thereby allowing the liquid to pass beneath its lower edge direct to the open delivery-passage. This gives a stream of the full capacity of the faucet. It will be seen that the faucet is thus capable of delivering the stream with two distinctly-different degrees of force and volume, so that when used on water-service of high pressure a person can draw water in a drinking glass or cup without having it ejected with sufficient force to throw the water from the glass by its reaction, or can, on the other hand, when desired, draw a large volume of water. The different degrees of force required to be exerted on the lever I for lifting the valve B from its seat, and that required for lifting the cup C from its seat when the valve engages therewith, are sufficient to perceptibly mark the first and second positions of the lever movement, so that the manipulation of the lever for the partial or full stream is readily accomplished by any one after a single trial, although no special indicating-stop is provided for the lever. While the lever I is held back the faucet continues open. On the release of the lever the cup drops to its seat, thus cutting off the greater portion of the flow to the valve B, while the valve is held raised from its seat by the suction or resistance to the formation of a vacuum within the chamber E above the valve or puppet-head and until the liquid gradually leaks into said chamber through the narrow annular space between the disk $B^2$ and the inner surface of the cup, thus controlling and retarding the movement and extending the action over an appreciable period of time—say from one to twelve seconds, more or less—and causing the valve to settle onto its seat gradually, to thus shut off the flow by gradual action, thereby avoiding shock or strain on the pipes and the usual pounding or thumping noise incident to the quick-closing faucets.

The length of time during which the closing movement of the valve is extended depends in a great measure upon the amount of space between the valve-disk $B^2$ and the cup C, and also in some degree on the size of the orifices c, the greater the space the less time occupied in closing the valve, and vice versa; hence in faucets designed to be used under very heavy pressures the fitting of the disk within the cup should be closer, while the orifices c should be made smaller than would be the case in faucets designed to be used under very light pressures. The slow or retarded action in the closing movement of the valve is automatically effected, and whether the valve is simply raised within the cup C without lifting the cup or raised sufficiently to engage with and lift the cup C from its seat $a^3$ the retardation in time of closing is attained in the working of the valve, and this action cannot be prevented, forced, or interfered with by the person using the faucet, as the valve is disconnected from its operating devices.

The faucet as herein shown is a self-closing faucet; but I do not wish to confine my invention solely to a self-closing faucet, since the cup and valve-puppet and the adjustable lifting-stud may be employed in faucets which are non-self-closing, and the present faucet could be made non-self-closing by the addition of any device whereby the lever or movable nozzle could be positively retained in position when the valve is elevated.

What I claim as of my invention, and desire to secure by Letters Patent, is—

1. A faucet having a primary valve that closes in the direction of the flow, an auxiliary valve or cup provided with small orifices in its side, arranged over said valve and fitting an annular seat around the primary valve-seat, and having a chamber above the valve from which the liquid is forced by the action of opening the valve, and into which the liquid must return through limited space as the valve closes, for the purpose set forth.

2. The combination, substantially as described, with the faucet body or shell A, having the valve-seat a, inlet-passage m, and discharge-passage $a'$, of the valve-puppet B, the cup C, arranged over said valve with its flange extending downward and surrounding said valve-puppet, and having the chamber E between said cup and valve, substantially as and for the purpose set forth.

3. The combination, substantially as described, of the faucet-body A, having the valve-seats $a\ a^3$, the valve-puppet B, having the dependent spindle $B'$ and auxiliary disk $B^2$, the cup C, having orifices c in its side, arranged over said valve and closing upon the seat $A^3$ around said valve, and a movable discharge-nozzle having a step that engages the valve-spindle, for the purposes set forth.

4. The combination, substantially as described, of the shell A, valve-puppet B, cup C, inverted over and surrounding said valve-puppet, movable nozzle D, sliding upon the body-extension $A'$, having the engaging step F, arranged across the interior of said nozzle below said extension, the lever I, fulcrumed on a projection of the body at K with its ends engaging a projection upon the exterior of said nozzle, for the purpose set forth.

5. In a faucet, the cup C, provided with a shoulder or lug, $C'$, disposed for engaging with the valve-puppet at an intermediate point in its movement to lift the flange of the cup from its seat $a^3$, as described, in combination with the valve-puppet, puppet-lifter, discharge-nozzle, and faucet-body, whereby the faucet is adapted for delivering the liquid in greater or less force and volume, substantially as set forth.

6. The combination, with the valve B and valve-operating nozzle D, of the bearing-step provided with an adjusting screw-stud, F, for the purpose set forth.

7. The bridge or bearing-step $F'$, separately constructed with the ends of its arms slightly inclined, in combination with the faucet-body A, valve B, and valve-operating nozzle D, internally bored with an intermediate beveled surface to match the end of said arm, and against which said arms are wedged for retaining the step in position, as set forth.

8. In a faucet wherein the valve is lifted by a step in connection with the discharge-nozzle, the valve-stem having a cavity, $f$, in combination with the valve-operating step and discharge-nozzle in its lower end, and the adjustable supporting-stud F, having its point $f'$ of less diameter than said cavity, substantially as described, and for the purpose set forth.

Witness my hand this 2d day of November, A. D. 1887.

ALBERT P. HOWES.

Witnesses:
CHAS. H. BURLEIGH,
ELLA P. BLENUS.